United States Patent
Vepa et al.

(10) Patent No.: US 6,490,632 B1
(45) Date of Patent: Dec. 3, 2002

(54) HIGH PERFORMANCE LOAD BALANCING AND FAIL OVER SUPPORT OF INTERNET PROTOCOL EXCHANGE TRAFFIC OVER MULTIPLE NETWORK INTERFACE CARDS

(75) Inventors: RamKrishna Vepa, Danville, CA (US); Roman G. Baker, San Jose, CA (US); Sameer Nanda, Sunnyvale, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/272,082

(22) Filed: Mar. 18, 1999

(51) Int. Cl.[7] ................................................ G06F 15/16
(52) U.S. Cl. ........................ 709/250; 709/105; 709/235; 709/321
(58) Field of Search ................................ 709/250, 201, 709/105, 235, 238, 321; 370/216, 217, 231; 714/4; 345/327

(56) References Cited

U.S. PATENT DOCUMENTS

| | | | |
|---|---|---|---|
| 5,774,660 A | * | 6/1998 | Brendel et al. |
| 5,918,021 A | * | 6/1999 | Aditya |
| 6,151,297 A | * | 11/2000 | Congdon et al. |
| 6,160,544 A | * | 12/2000 | Hayashi et al. |
| 6,243,360 B1 | * | 6/2001 | Basilico |
| 6,253,334 B1 | * | 6/2001 | Amdahl et al. |
| 6,314,525 B1 | * | 11/2001 | Mahalingham et al. |

\* cited by examiner

*Primary Examiner*—Ayaz Sheikh
*Assistant Examiner*—Oanh Duong
(74) *Attorney, Agent, or Firm*—Wagner, Murabito & Hao LLP

(57) ABSTRACT

A method for selecting a network interface card (NIC) to be used to send and receive data packets in an Internetwork Protocol Exchange (IPX) environment using a server computer system having a plurality of NICs coupled thereto. An outgoing data packet is addressed using an IPX address and a socket number. A load balancing scheme is executed in order to select a NIC from the plurality of NICs. In one embodiment, the load balancing scheme is a function of the IPX address; in alternate embodiments, the load balancing scheme is a function of the IPX address and either the destination or source socket number. The media access control (MAC) address that represents the selected NIC is inserted in the outgoing data packet. The data packet is then sent using the selected NIC. In one embodiment, the present invention also provides a system and method for fault tolerance and fail over support. The plurality of NICs each include a filter that is adapted to mask a portion of a MAC address in an incoming data packet received at a NIC such that the MAC address in the incoming data packet is equivalent to the MAC address representing the NIC.

27 Claims, 10 Drawing Sheets

HIGH PERFORMANCE LOAD BALANCING AND FAIL OVER SUPPORT OF INTERNET PROTOCOL EXCHANGE TRAFFIC OVER MULTIPLE NETWORK INTERFACE CARDS

TECHNICAL FIELD

The present invention relates to the field of computer system networks. In particular, the present invention pertains to a software-based module for augmenting a server computer system to perform network interface card load balancing and fail over support for fault tolerance.

BACKGROUND ART

Computer systems linked to each other in a network are commonly used in businesses and other organizations. Computer system networks ("networks") provide a number of benefits for the user, such as increased productivity, flexibility, and convenience as well as resource sharing and allocation.

Networks are configured in different ways depending on implementation-specific details such as the hardware used and the physical location of the equipment, and also depending on the particular objectives of the network. In general, networks include one or more server computer systems, each communicatively coupled to numerous client computer systems.

One common type of network configuration includes a number of virtual local area networks (VLANs). VLANs provide numerous advantages, a primary advantage being that the client computer systems associated with a particular server computer system do not need to all be in the same physical location.

In contemporary networks, server computer systems are typically coupled to the network using more than one network interface card (NIC). Multiple NICs increase the total available bandwidth capacity for transmitting and sending data packets. Multiple NICs also provide resiliency and redundancy if one of the NICs fails. In the case of a failure of a NIC, one of the other NICs is used to handle the traffic previously handled by the failed NIC, thereby increasing overall system reliability. Accordingly, it is necessary to be able to detect when a NIC fails and, when a failed NIC is detected, to switch to a functioning NIC (this is referred to as fault tolerance and fail over support).

In addition, it is desirable to balance the traffic over each NIC when multiple NICs are used so that one NIC doesn't handle too much traffic and become a bottleneck (this is referred to as load balancing). The use of load balancing allows the spare capacity provided by the multiple NICs to be effectively utilized. It is not necessary to hold a NIC in reserve in case one of the NICs fails; instead, all NICs can be used, thereby increasing the overall performance of the server computer system and hence the network.

Prior Art FIG. 1 is an illustration of exemplary network 50 including two VLANs. In network 50, client computer system 140 (e.g., a workstation) is in one VLAN, and client computer systems 141, 142 and 143 are in a second VLAN. Both VLANs are serviced by server computer system 160. A data packet sent by server computer system 160 contains address information that is used to identify the particular client computer system(s) to which the data packet is to be sent. In addition, the data packet is tagged with a VLAN identifier that identifies the destination VLAN. The methods for addressing a data packet in a network comprising multiple VLANs are well known in the art; one method is defined by the IEEE 802.1Q standard.

Switches 150 and 151 are able to read the VLAN identifier and the other address information contained in the data packet and direct the data packet accordingly. Thus, switch 150 reads the VLAN identifier and will direct the data packet to client computer system 140 if appropriate. Otherwise, the data packet proceeds to switch 151, which directs the data packet to the proper client computer system (e.g., client computer systems 141, 142 or 143) depending on the address information contained in the data packet.

One prior art technique for load balancing and fault tolerance with fail over support utilizes a switch-dependent protocol implemented using server computer system 160 and switches 150 and 151. This prior art technique also requires NICs that are specifically designed for compatibility with switches 150 and 151 and the switch-dependent protocol. This prior art technique is problematic because it requires that the switch be designed with the capability to implement the load balancing and fault tolerance schemes. Thus, the complexity and the cost of the switch are substantially increased. Even so, the capabilities of the switch are relatively limited, and so the schemes for providing load balancing and fault tolerance are also limited.

With regard to load balancing, other prior art techniques attempt to address the drawbacks identified above by implementing software-based load balancing methods implemented on a server computer system. The prior art load balancing methods used in these techniques are based on either a round-robin approach or an approach using the media access control (MAC) address that is associated with each NIC (a unique MAC address is assigned to each NIC by the vendor of the NIC).

In a round-robin load balancing approach, a first data packet is sent out using a first NIC, a second data packet with a second NIC, and so on; when all NICs have been used to send out a data packet, the sequence returns to the first NIC and the cycle is continuously repeated. However, the round-robin load balancing approach is problematic because multiple data packets are typically associated with a given session or transaction between a server computer system and a client computer system. Thus, multiple NICs may be used for a single transaction involving multiple data packets. Consequently, the data packets for that transaction often reach the client computer system out of order. Some computer system protocols are not able to properly handle out-of-order data packets and so the data packets have to be retransmitted until they are received by the client computer system in the proper order. Thus, the round-robin load balancing approach causes a high incidence of retransmissions that increase the time needed to complete a transaction and reduce the overall performance of the computer system network.

In the MAC-based load balancing approach, the selected NIC is chosen by applying some type of procedure that aligns a NIC with a particular MAC address so that, in essence, a data packet bound for the particular MAC address is always sent out over the same NIC. While this addresses the problem of out-of-order data packets associated with the round-robin load balancing approach, the MAC-based approach introduces additional problems. For instance, all client computer systems lying across a particular router will be assigned to the same NIC because the client computer systems all contain the same MAC address (the MAC address for the router); hence, if traffic across this router is normally heavy relative to other routers, the load over the associated NIC will not be balanced relative to other NICs. In addition, the MAC-based load balancing approach is based on the distribution of MAC addresses across the client computer systems, and because the MAC addresses may not be evenly distributed (e.g., one router may serve more client computer systems than another router), the load across the NICs will not be evenly balanced. Also, the bandwidth available to the client computer system is limited by the bandwidth of the NIC that the client computer system is associated with by the MAC address; for example, by virtue of its MAC address, a client computer system with a one gigabit/second NIC may be affiliated with a 100 megabits/second NIC, and consequently the bandwidth of the client computer system is limited to 100 megabits/second.

With regard to fault tolerance and fail over support, a problem exists in the prior art when certain protocols, such as Internet Protocol Exchange (IPX), are used to address outgoing data packets. With IPX, when a data packet is transmitted from a server computer system over a particular NIC, the response from the client computer system is automatically returned via the same NIC. Thus, if the NIC used for the outgoing data packet fails, the client computer system needs to respond to a different NIC.

However, the prior art is problematic because a mechanism is typically not in place for informing the client computer system of the failed NIC. Even if such a mechanism is present, the client computer system may send a data packet before it is informed of the failed NIC.

In addition, with IPX, if the address in the data packet does not correspond to the proper NIC address, then the data packet is dropped (e.g., not delivered to the server computer system). Therefore, the prior art is also problematic because a return data packet sent to a functioning NIC will be dropped if the address does not correspond to the proper NIC address. For example, a client computer system addresses a data packet with a particular NIC address and the data packet is transmitted; however, in the interim the addressed NIC fails, and so the data packet is routed to a different NIC. With IPX, because the NIC address in the data packet does not correspond to the NIC to which the data packet was routed, the data packet is dropped.

Accordingly, a need exists for a system and method for load balancing and fault tolerance wherein the system and method are not limited by the capabilities of a switch. A need further exists for a system and method that satisfy the above needs and do not cause data packets to be transmitted or received out of order and also overcome the shortcomings associated with a MAC-based load balancing approach described above. In addition, a need exists for a system and method that satisfy the above needs and provide fault tolerance and fail over support for the IPX protocol.

DISCLOSURE OF THE INVENTION

The present invention provides a system and method for fault tolerance and for load balancing traffic across network interface cards (NICs) wherein the system and method are not limited by the capabilities of a switch. Furthermore, the present invention provides a system and method that satisfy the above needs and do not cause data packets to be transmitted or received out of order and also overcome the shortcomings associated with a MAC-based approach; namely, the present invention does not assign the same NIC to all traffic across a router, balances the load more evenly across all NICs, and does not unnecessarily limit the bandwidth available to a client computer system. In addition, the present invention provides a system and method that satisfy the above needs and provide fault tolerance and fail over support for the Internetwork Protocol Exchange (IPX) protocol.

Specifically, in one embodiment, the present invention pertains to a system and method implemented on a server computer system having a plurality of NICs coupled thereto, wherein the system and method are used to select a NIC for sending an outgoing data packet from the server computer system. The outgoing data packet is addressed using an IPX address and a socket number. A load balancing scheme is executed in order to select a NIC from the plurality of NICs. The media access control (MAC) address that represents the selected NIC is inserted in the outgoing data packet. The data packet is then sent using the selected NIC.

In one embodiment, the load balancing scheme is a function of the IPX address. In that embodiment, the load balancing scheme is defined by:

SelectedNIC=IPXAddress MOD NumberNICs;

wherein "SelectedNIC" is the selected NIC, "IPXAddress" is the IPX address of the outgoing data packet, and "NumberNICs" is the number of NICs coupled to the server computer system.

In alternate embodiments, the load balancing scheme is a function of the IP address and either the destination or source port number. In these embodiments, the load balancing scheme is defined by:

SelectedNIC=(IPXAddressXOR DestIPXSocket)MOD NumberNICs; or

SelectedNIC=(IPXAddressXOR SourceIPXSocket)MOD NumberNICs; or

SelectedNIC=(IPXAddressXOR SourceIPXSocket XOR DestIPXSocket)MOD NumberNICs;

wherein "SelectedNIC" is the selected NIC, "IPXAddress" is the IPX address of the outgoing data packet, "SourceIPXSocket" is the socket number for a source socket of the outgoing data packet, "DestIPXSocket" is the socket number for a destination socket of the outgoing data packet, and "NumberNICs" is the number of NICs coupled to the server computer system.

In one embodiment, the present invention also provides a system and method for fault tolerance and fail over support. The plurality of NICs of the server computer system each include a filter that is adapted to mask a portion of a MAC address in an incoming data packet received at a NIC such that the MAC address in the incoming data packet is equivalent to the MAC address representing the NIC.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
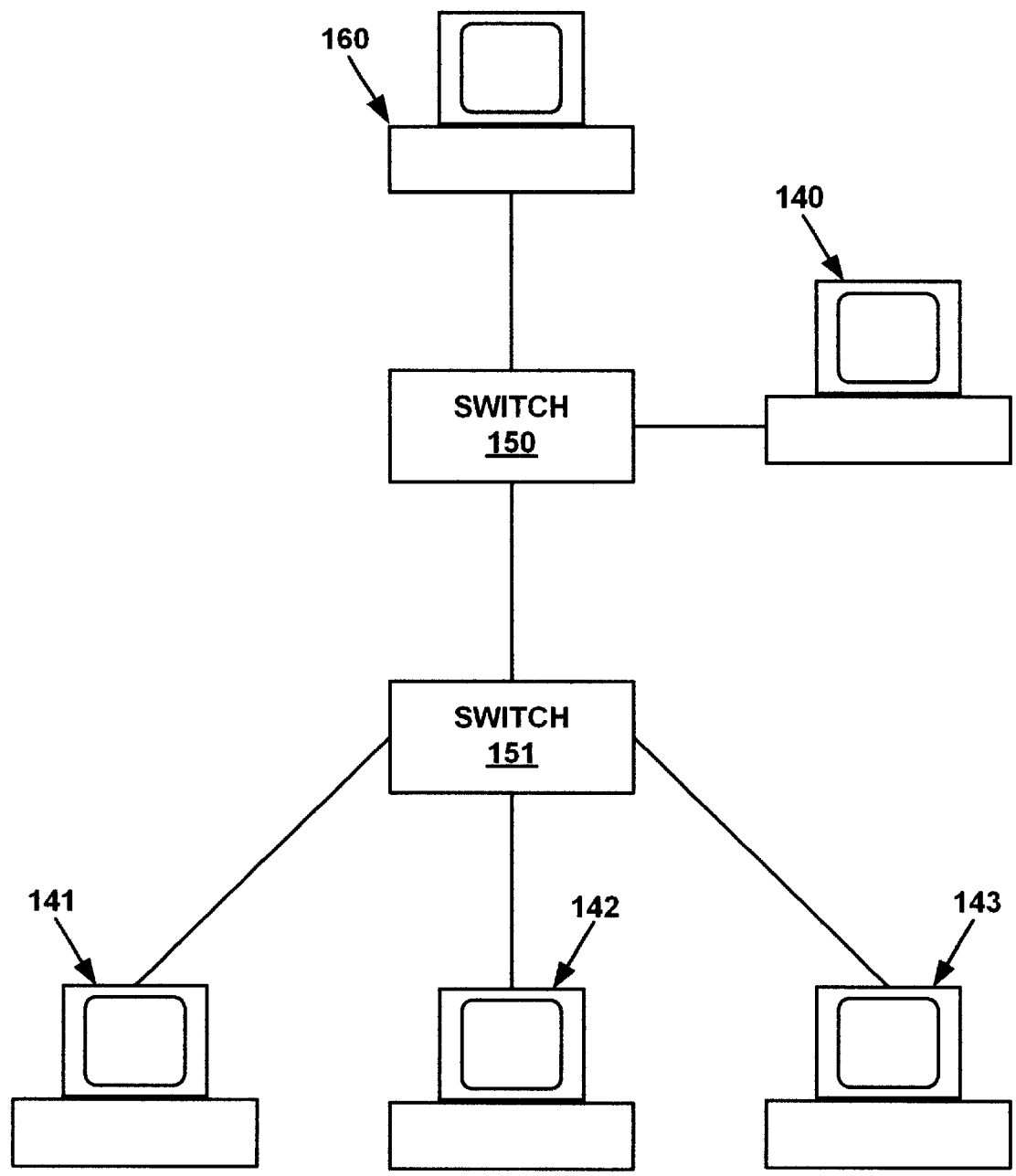
FIG. 1 is a block diagram of an exemplary computer system network of the prior art.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "addressing" or "executing" or "inserting" or "replacing" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention pertains to a method for selecting a network interface card (NIC) to be used to send and receive data packets in an Internetwork Protocol Exchange (IPX) environment using a server computer system having a plurality of NICs coupled thereto. The outgoing data packet is addressed using an IPX address and a socket number. A load balancing scheme is executed in order to select a NIC from the plurality of NICs. The media access control (MAC) address that represents the selected NIC is inserted in the outgoing data packet. The data packet is then sent using the selected NIC. In one embodiment, the load balancing scheme is a function of the IPX address. In alternate embodiments, the load balancing scheme is a function of the IPX address and either the destination or source socket number. In one embodiment, the present invention also provides a system and method for fault tolerance and fail over support. The plurality of NICs each include a filter that is adapted to mask a portion of the MAC address in an incoming data packet received at a NIC such that the MAC address in the incoming data packet is equivalent to the MAC address representing the NIC.

Figure 2:
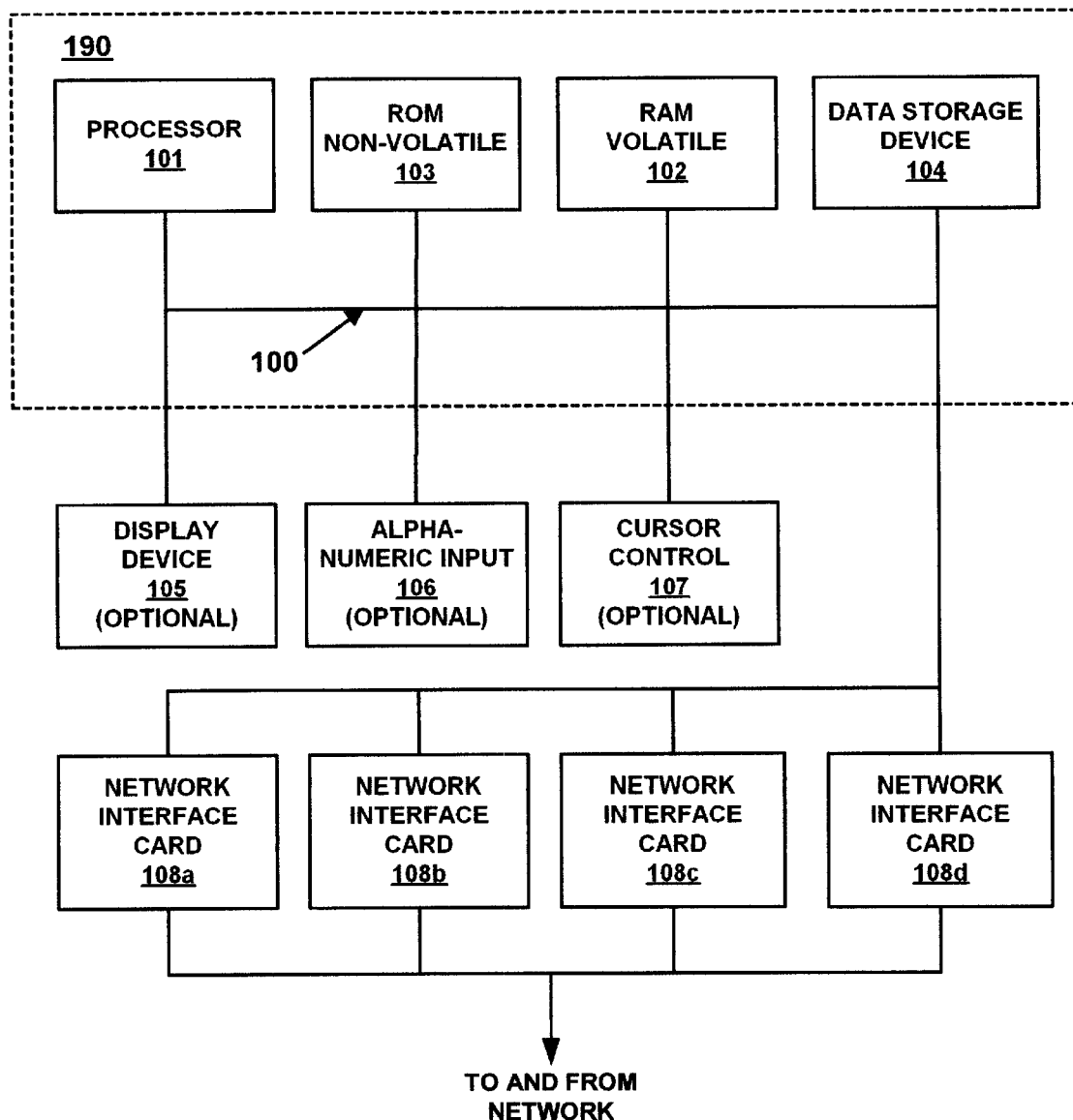
FIG. 2 shows a general purpose server computer system upon which embodiments of the present invention may be implemented.

Refer to FIG. 2 which illustrates an exemplary server computer system 190 upon which embodiments of the present invention may be practiced. Server computer system 190 is communicatively coupled to other computer systems (not shown) in a network.

In general, server computer system 190 used by the embodiments of the present invention comprises a bus 100 for communicating information, a central processor 101 coupled with bus 100 for processing information and instructions, a random access memory 102 coupled with bus 100 for storing information and instructions for central processor 101, a read-only memory 103 coupled with bus 100 for storing static information and instructions for central processor 101, a data storage device 104 such as a magnetic or optical disk and disk drive coupled with bus 100 for storing information and instructions, an optional display device 105 coupled to bus 100 for displaying information to the computer user, an optional alphanumeric input device 106 including alphanumeric and function keys coupled to bus 100 for communicating information and command selections to central processor 101, and an optional cursor control device 107 coupled to bus 100 for communicating user input information and command selections to central processor 101.

Display device 105 of FIG. 2 utilized with server computer system 190 of the present embodiment may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control device 107 also may be directed and/or activated via input from the keyboard using special keys and key sequence commands. Alternatively, the cursor may be directed and/or activated via input from a number of specially adapted cursor directing devices.

Continuing with reference to FIG. 2, server computer system 190 is adapted to be coupled via bus 100 to a plurality of network interface cards (NICs) exemplified by NICs 108a, 108b, 108c and 108d. NICs 108a–d provide the physical communication link between server computer system 190 and a network of client computer systems and other server computer systems (not shown). Any of a number of different and well known types of NICs may be used to communicate with the network of client and server computer systems. It is appreciated that any number of NICs may be utilized in accordance with the present invention. It is further appreciated that NICs 108a–d may be integrated into server computer system 190 or they may be externally coupled to server computer system 190.

Figure 3A:
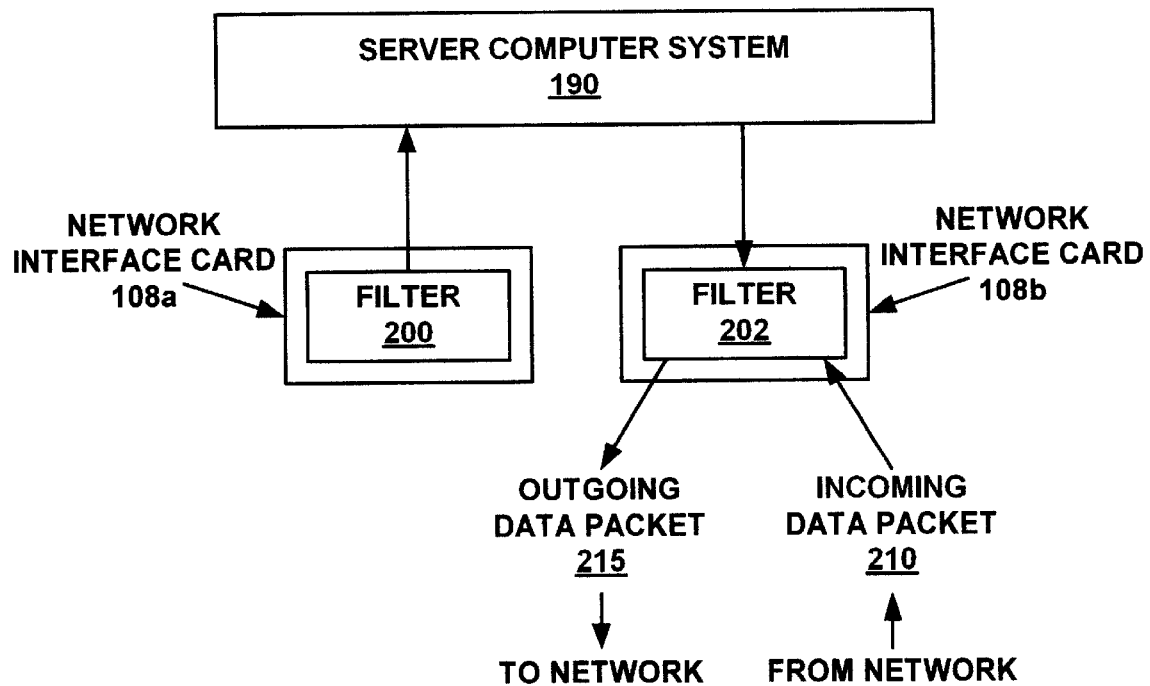
FIGS. 3A and 3B show a network interface card incorporating a filter in accordance with one embodiment of the present invention.
Figure 3B:
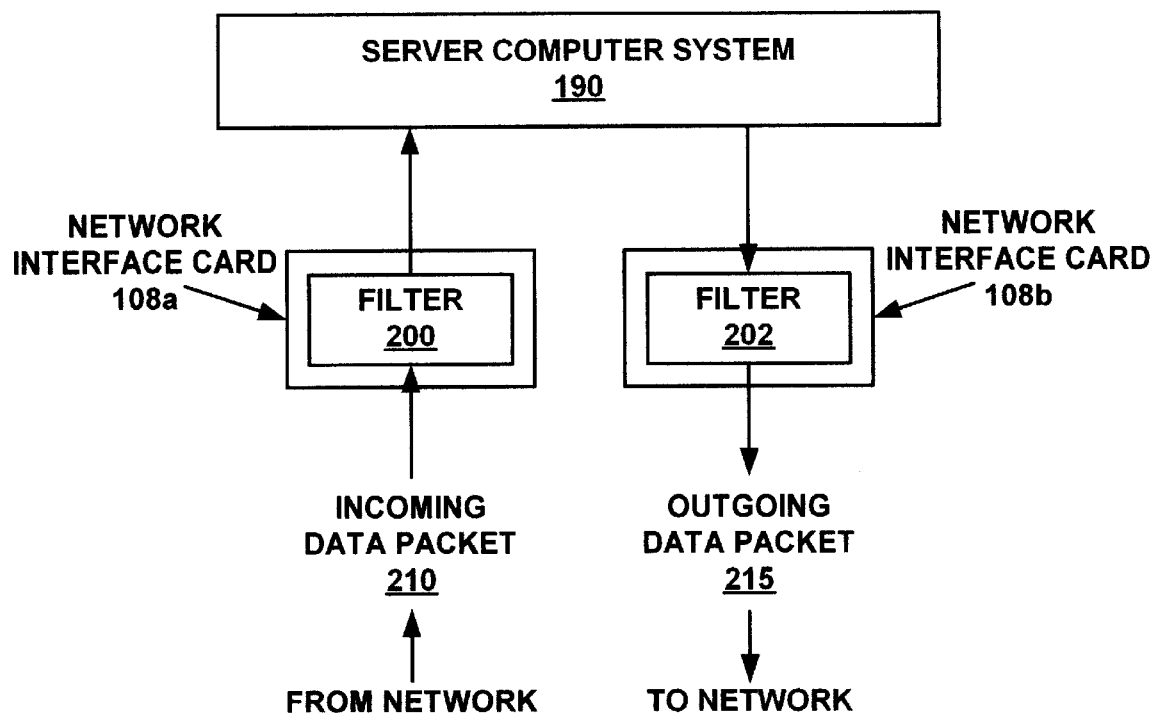

FIGS. 3A and 3B show network interface cards (e.g., NIC 108a and 108b) each incorporating a filter (e.g., filters 200 and 202, respectively) in accordance with one embodiment of the present invention. Filters 200 and 202 are utilized to provide fail over support for fault tolerance in the IPX environment. The filters intercept each incoming data packet and mask out some portion of the MAC address contained in the incoming data packet. Outgoing data packets may also pass through the filters, but in the present embodiment the filters do not perform a function for outgoing data packets.

With reference first to FIG. 3A, both NICs 108a and 108b are functioning. In the IPX environment, when outgoing data packet 215 is transmitted from server computer system 190 via a NIC (e.g., NIC 108b), the response data packet (e.g., incoming data packet 210) is automatically returned to server computer system 190 via NIC 108b. Outgoing data packet 215 and incoming data packet 210 each have the MAC address for NIC 108b. Outgoing data packet 215 and incoming data packet 210 pass through filter 202, but in the present embodiment the filter performs no function with NIC 108b functioning.

Figure 7:
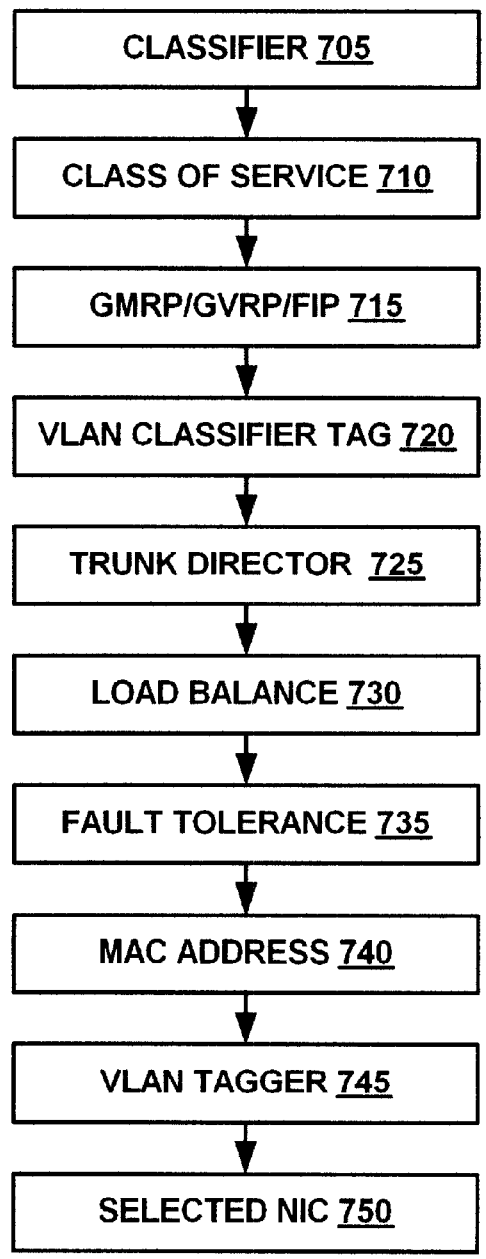
FIG. 7 is a flowchart of one embodiment of the process executed for an outgoing data packet in accordance with the present invention.

With reference now to FIG. 3B, after transmitting outgoing data packet 215, NIC 108b stops functioning and traffic is automatically switched to a functioning NIC such as NIC 108a (refer to the discussion of the fault tolerance scheme described in conjunction with FIG. 7). However, incoming data packet 210 is associated with outgoing data packet 215 and contains the MAC address for NIC 108b; thus, incoming data packet 210 contains a MAC address that is different from the MAC address for NIC 108a.

In accordance with the present invention, filter 200 intercepts incoming data packet 210 before the data packet is dropped. In the present embodiment, filter 200 causes NIC 108a to ignore the first byte or a portion of the first byte in the MAC address in incoming data packet 210. As such, filter 200 causes NIC 108a to accept incoming data packet 210 even if the incoming data packet has a MAC address different than the MAC address for NIC 108a. In this manner, the present invention provides fault tolerance and fail over support for the IPX protocol.

In order for a switch to learn to forward NIC 108b data packets to NIC 108a, keep-alive data packets with a source address of both NICs 108a and 108b are transmitted periodically.

For example, NIC 108a has MAC address 00.22.33.44.55.60 and NIC 108b has MAC address 00.22.33.44.55.61. In the present embodiment, filter 200 causes the right-hand portion of the MAC address to be ignored; that is, the portions of the MAC addresses containing "60" and "61" are ignored. From the perspective of NICs 108a and 108b, the MAC address is read as 00.22.33.44.55.xx, where "xx" can represent any set of values; therefore, in accordance with the present invention, NICs 108a and 108b can each accept incoming data packets containing a MAC address for the other NIC.

Figure 4:
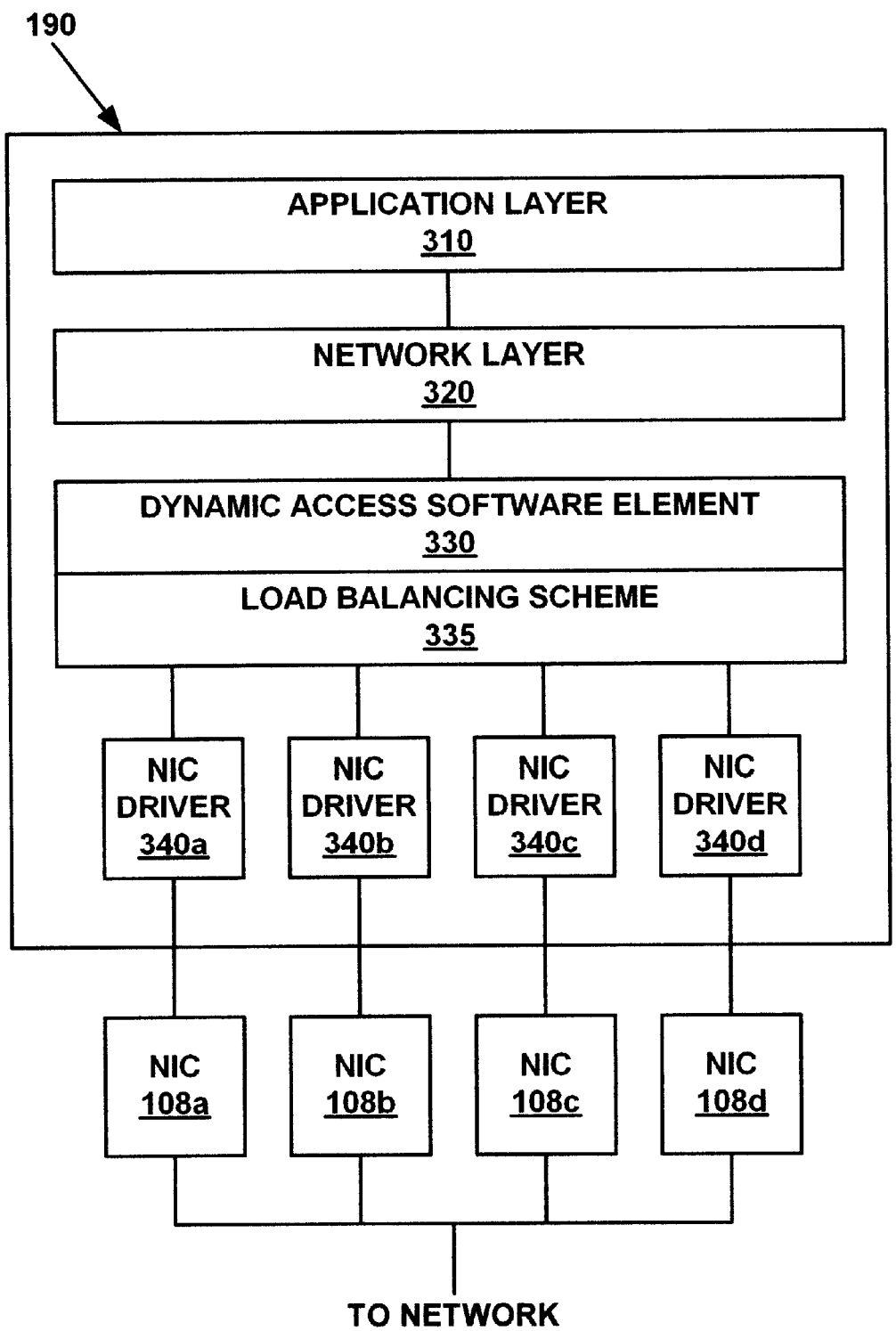
FIG. 4 is a hardware and software data flow diagram of the logical components of the server computer system of FIG. 2 in accordance with one embodiment of the present invention.

FIG. 4 is a hardware and software data flow diagram of the logical components of server computer system 190 in accordance with one embodiment of the present invention. In the present embodiment, application layer 310 and network layer 320 are software elements having the functions and responsibilities defined by the well-known International Standards Organization/Open System Interconnection (ISO/OSI) reference model; however, it is appreciated that the present invention is not limited to this type of configuration or the ISO/OSI reference model. Application layer 310 and network layer 320 constitute a portion of the software elements in server computer system 190 commonly referred to as the protocol stack; it is understood that for simplicity only the relevant layers of the ISO/OSI reference model are shown in FIG. 4.

Application layer 310 defines the manner in which application programs (e.g., computer software programs, word processors, database management systems, electronic mail, and the like) interact with the communication network.

Network layer 320 contains the computer-to-computer or computer-to-network protocol that defines the procedures to be followed when data packets are transmitted and received. The protocols used by network layer 320 include, for example, IP (Internet Protocol), IPX (Internetwork Packet Exchange), or other protocols known in the art. Network layer 320 is responsible for determining addresses or for translating hardware addresses to network addresses. In the present embodiment, network layer 320 utilizes IPX; thus, the address contained in an outgoing data packet also includes an IPX address and a socket number.

Continuing with reference to FIG. 4, in the present embodiment server computer system 190 is adapted to have a plurality of NICs; for illustration purposes, only four NICs 108a–d are shown, although it is appreciated that any number of NICs may be used in accordance with the present invention. Associated with each of NICs 108a–d are NIC drivers 340a–d, respectively. In the ISO/OSI reference model, NICs 108a–d correspond to the physical layer and NIC drivers 340a–d correspond to the data-link layer. NIC drivers 340a–d provide an interface for the protocols of network layer 320. NIC drivers 340a–d also provide media access control; that is, they provide access to the particular physical encoding and transport scheme used by NICs 108a–d.

As described above, NICs 108a–d provide the physical connection to the network. Each of NICs 108a–d has a unique media access control (MAC) address. In accordance with the present embodiment of the present invention, each of NICs 108a–d incorporate a filter (e.g., filter 200 of FIGS. 3A and 3B) for masking out a portion or portions of the MAC address contained in an incoming data packet, thereby providing fail over support and fault tolerance in the IPX environment.

In the present embodiment, the present invention includes a software element (e.g., load balancing scheme 335) introduced into server computer system 190 between network layer 320 and NIC drivers 340a–d. As such, load balancing scheme 335 is positioned to intercept all data packets sent by server computer system 190, as well as all other like transactions such as requests, sets and gets. Load balancing scheme 335 is used to select one NIC out of the plurality of NICs which will be used to transmit outgoing data packets.

By integrating load balancing scheme 335 into server computer system 190, the present embodiment of the present invention takes advantage of the abundant resources (e.g., processing power and memory) available in a server computer system. In addition, because load balancing scheme 335 is incorporated entirely into server computer system 190, it is switch-independent and thus can be used with different types of switches including legacy devices. As will be seen by the discussion below, there are a number of other advantages associated with the present invention.

In one embodiment, load balancing scheme 335 is a function of the IPX address. In that embodiment, the load balancing scheme is defined by the following function:

SelectedNIC=IPXAddress MOD NumberNICs;

wherein "SelectedNIC" is the selected NIC, "IPXAddress" is the IPX address of the outgoing data packet, and "NumberNICs" is the number of NICs coupled to the server computer system. "MOD" is a known operation and is illustrated by the example below. In the present embodiment, the least significant bit of the IPX address is used.

In alternate embodiments, load balancing scheme 335 is a function of the IPX address and either the destination or source socket number. In these embodiments, the load balancing scheme is defined by one of the following functions:

SelectedNIC=(IPXAddress XOR DestIPXSocket)MOD NumberNICs; or

SelectedNIC=(IPXAddress XOR SourceIPXSocket)MOD NumberNICs; or

SelectedNIC=(IPXAddress XOR SourceIPXSocket XOR DestIPXSocket)MOD NumberNICs;

wherein "SelectedNIC" is the selected NIC, "IPXAddress" is the IPX address of the outgoing data packet, "SourceIPXSocket" is the socket number for a source socket of the outgoing data packet, "DestIPXSocket" is the socket number for a destination socket of the outgoing data packet, and "NumberNICs" is the number of NICs coupled to the server computer system. "MOD" and "XOR" are known operations that are illustrated in the following example. In the present embodiment, the least significant bit of the IP address and socket number are used.

Following is an illustrative example of the use of the embodiment of load balancing scheme 335 defined by: SelectedNIC=(IPXAddress XOR DestIPXSocket) MOD NumberNICs. Network layer 320 specifies an IPX address of 128.1.1.2 and a destination socket number of 5. In the XOR operation, the least significant bits are represented as binary numbers. The XOR operation is as follows:

$$\begin{array}{r} 2 = 0\ 1\ 0 \\ 5 = 1\ 0\ 1 \\ \hline \text{XOR}\ \overline{1\ 1\ 1}\ = 7 \end{array}$$

In the MOD operation, the result from the XOR operation is divided by the number of NICs, and the remainder is used as the means for identifying the NIC over which the outgoing data is to be transmitted as follows (in this example, four NICs are used):

$$4\overline{\smash{\big)}\,7}\phantom{0}\atop{\phantom{4)}3}{\phantom{0}}^{1}$$

Thus, in this example, the remainder of 3 is used to identify NIC number 3 as the selected NIC.

Load balancing scheme 335 as a function of the IPX address alone or in combination with the socket number incorporates a number of advantages. First, it evenly distributes the outgoing data packets over each of the NICs because the parameters used to select the NIC in each of the embodiments of load balancing scheme 335 are equally weighted, and thus a relatively even distribution is expected. In addition, for the same IPX address and socket number, the same NIC is selected, so that an affinity is established between a NIC and a client computer system; thus, for a transaction involving multiple outgoing data packets, each data packet will be sent out in the proper order over the same NIC and received by the client computer system in the proper order. Also, outgoing traffic to different client computer systems across the same router will be distributed across different NICs because each client computer system has a different IP address. Furthermore, for multiple transactions between a client computer system and the server computer system, a different NIC may be selected for each transaction because a different socket number will be associated with each transaction; this addresses those situations in which a client computer system with a one gigabit/second NIC is in communication with a server computer system having multiple 100 megabit/second NICs.

In accordance with the present invention, the load balancing function being used by load balancing scheme 335 can be dynamically switched to another load balancing function if it is determined that one of the NICs is not being used. Each of the different load balancing functions are executed until a result is achieved that names the unused NIC as the selected NIC. The load balancing function that provided the desired result then continues to be utilized until it is subsequently determined that another NIC is not being used, at which point a different load balancing function is chosen in the manner just described. Thus, the present invention incorporates a mechanism that provides additional assurance that the outgoing traffic is evenly distributed over all of the NICs.

With reference still to FIG. 4, in one embodiment, load balancing scheme 335 is implemented as one module of dynamic access software element 330. In general, dynamic access software element 330 represents a system and method for sending and receiving data packets over a network of computer systems from a server computer system having a plurality of NICs coupled thereto. Dynamic access software element 330 may incorporate features such as fault tolerance, class of service (for assigning a priority to outgoing data packets), multicast registration, and support of virtual local area networks (VLANs) compliant with IEEE standard 802.1Q. It is appreciated that the present invention load balancing scheme 335 is not limited to implementation with dynamic access software element 330.

In one embodiment, dynamic access software element 330 consists of a protocol and a media access control (MAC) driver. A virtual MAC is created by dynamic access software element 330 for each VLAN included in the computer system network. Similarly, a virtual MAC can correspond to a unique IPX and subnet address. The virtual MAC address is used to represent the MAC addresses of NICs 108a–d.

Thus, in the embodiment of the present invention in which load balancing scheme 335 is implemented using dynamic access software element 330, an outgoing data packet is addressed in network layer 320 using a first MAC address. In the present embodiment, the first MAC address is the virtual MAC address representing NICs 108a–d. A NIC is selected from NICs 108a–d using load balancing scheme 335. The first MAC address in the outgoing data packet is replaced with a second MAC address, wherein the second MAC address represents the selected NIC. The outgoing data packet is then transmitted using the selected NIC.

Figure 5:
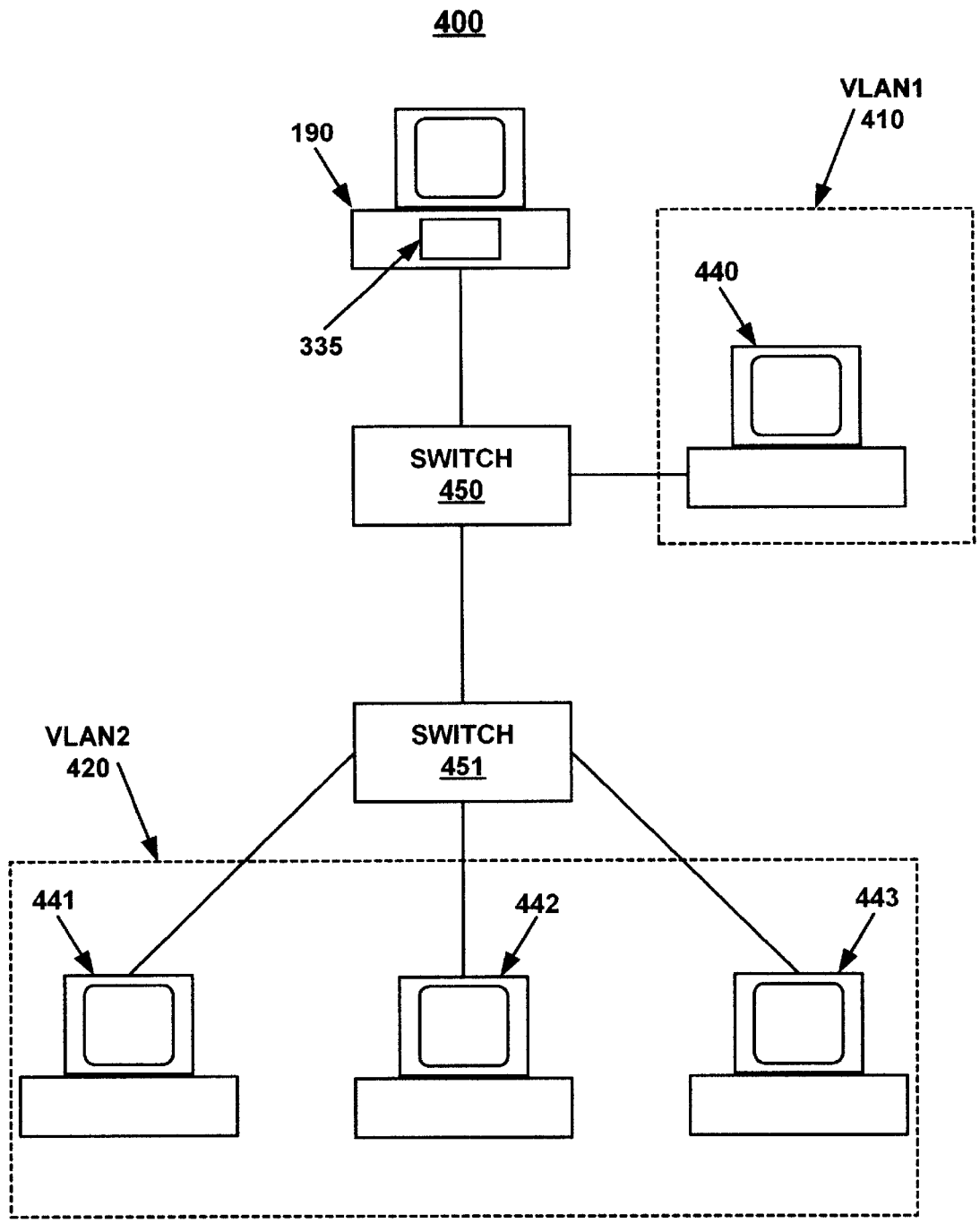
FIG. 5 is a block diagram of an exemplary computer system network including the server computer system of FIG. 2 upon which embodiments of the present invention may be implemented.

FIG. 5 is a block diagram of an exemplary network 400 comprised of server computer system 190 incorporating load balancing scheme 335 and coupled to VLAN1 410 and VLAN2 420 via switches 450 and 451. VLAN1 410 is comprised of client computer system 440, and VLAN2 420 is comprised of client computer systems 441, 442 and 443. In this embodiment, network 400 is compliant with IEEE standard 802.1Q. It is appreciated that other network configurations made up of different numbers of components may be utilized in accordance with the present invention. In accordance with the present invention, switches 450 and 451 may be any of a variety of well known switches.

Figure 6A:
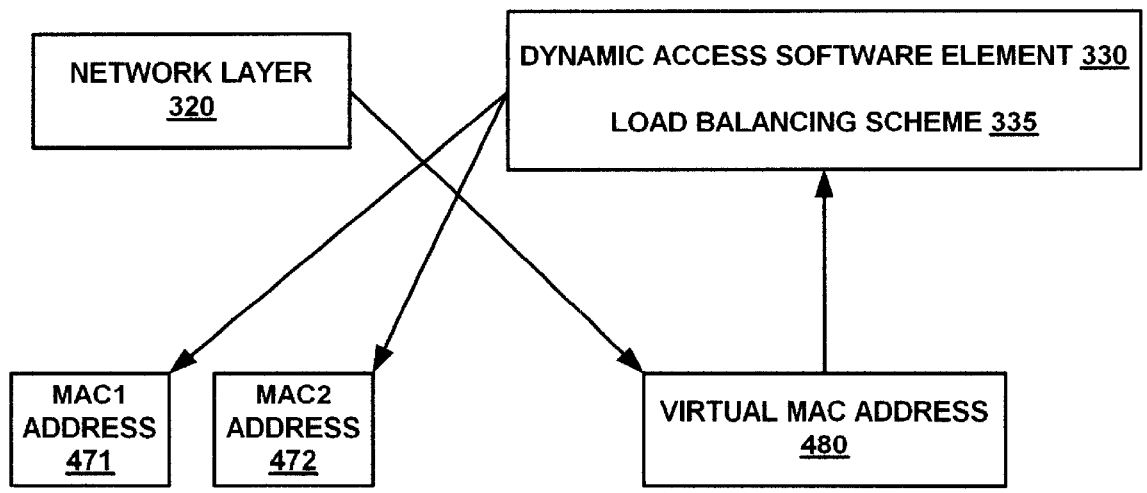
FIGS. 6A and 6B are block diagrams of the software configuration of the server computer system of FIG. 2 in accordance with one embodiment of the present invention.
Figure 6B:
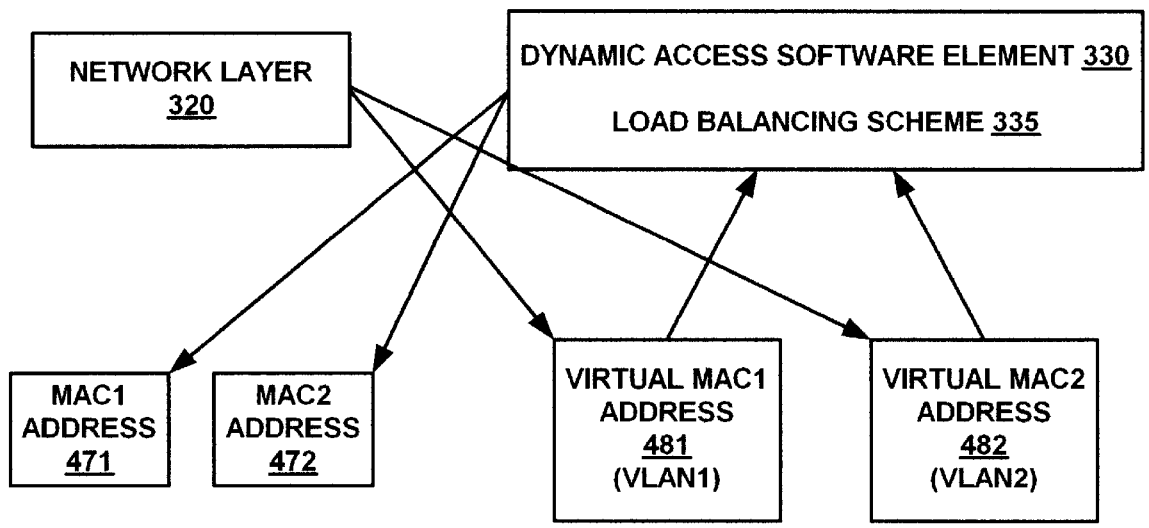

FIGS. 6A and 6B represent the software configuration of server computer system 190 (FIG. 2) for various implementations of one embodiment of the present invention. FIGS. 6A and 6B indicate the direction of an outgoing data packet from server computer system 190; all requests, sets and gets also follow the paths indicated. It is appreciated that for simplicity of discussion, only two NICs and two VLANs are presented; however, any number of NICs and VLANs may be utilized in accordance with the present invention.

With reference to FIG. 6A, server computer system 190 has two NICs coupled thereto represented, respectively, by MAC1 address 471 and MAC2 address 472. The network comprises a single VLAN (e.g., VLAN1 410). With multiple NICs, load balancing scheme 335 is enabled in accordance with the present invention. In the present embodiment, load balancing scheme 335 is implemented via dynamic access software element 330.

In the present embodiment, dynamic access software element 330 creates virtual MAC address 480 corresponding to VLAN1 410. Virtual MAC address 480 is registered with the Network Driver Interface Specification (NDIS) wrapper. Accordingly, network layer 320 is bound to virtual MAC address 480, which in turn is bound to dynamic access software element 330, which in turn is bound to MAC1 address 471 and MAC2 address 472. Hence, network layer 320 is not bound directly to MAC1 address 471 and MAC2 address 472 except through virtual MAC address 480 and dynamic access software element 330.

Continuing with reference to FIG. 6A, virtual MAC 480 represents both MAC1 address 471 and MAC2 address 472 to network layer 320. That is, from the perspective of network layer 320, the NICs appear to be a single NIC with a single MAC address (the virtual MAC address). Thus, network layer 320 specifies a single MAC address (the virtual MAC address) in an outgoing data packet. Dynamic access software element 330 executes load balancing scheme 335 to select one of the NICs to be used to transmit the outgoing data packet. Dynamic access software element 330 then converts the virtual MAC address (the address specified by network layer 320) into the MAC address corresponding to the NIC that will be used to transmit the data packet. Additional details are provided below in conjunction with FIG. 7.

With reference to FIG. 6B, server computer system 190 has two NICs coupled thereto represented by MAC1 address 471 and MAC2 address 472, respectively. The network comprises two VLANs (e.g., VLAN1 410 and VLAN2 420). With multiple NICs, load balancing scheme 335 is enabled. In the present embodiment, load balancing scheme 335 is implemented via dynamic access software element 330.

In the present embodiment, dynamic access software element 330 creates virtual MAC1 address 481 and virtual MAC2 address 482 which correspond to VLAN1 410 and VLAN2 420, respectively. Virtual MAC1 address 481 and virtual MAC2 address 482 are registered with the NDIS wrapper. Accordingly, network layer 320 is bound to both virtual MAC1 address 481 and virtual MAC2 address 482, which in turn are bound to dynamic access software element 330, which in turn is bound to MAC1 address 471 and MAC2 address 472.

Continuing with reference to FIG. 6B, virtual MAC 480 represents both MAC1 address 471 and MAC2 address 472 to network layer 320. That is, from the perspective of network layer 320, the NICs appear to be a single NIC with a single MAC address (the virtual MAC address). Thus, network layer 320 specifies a single MAC address (the virtual MAC address) in an outgoing data packet. Network layer 320 also specifies the virtual MAC address corresponding to the VLAN that is the destination of the outgoing data packet. Dynamic access software element 330 executes load balancing scheme 335 to select one of the NICs to be used to transmit the outgoing data packet. Dynamic access software element 330 then converts the virtual MAC address (the address specified by network layer 320) into the MAC address corresponding to the NIC that will be used to transmit the data packet. Dynamic access software element 330 also inserts the actual VLAN identifier for the destination VLAN. Additional details are provided below in conjunction with FIG. 7.

FIG. 7 is a flowchart of one embodiment of process 700 executed by dynamic access software element 330 to implement load balancing scheme 335 and fault tolerance with fail over support in accordance with the present invention. Process 700 includes a number of features in addition to load balancing scheme 335 that can be implemented by dynamic access software element 330; however, it is appreciated that in alternate embodiments a subset of these features may be used, and that in other embodiments other features (e.g., snap-ins) not described herein may be implemented.

In step 705, dynamic access software element 330 receives a data packet from network layer 320. The outgoing data packet contains the MAC address specified by network layer 320; as described above, network layer 320 is bound to dynamic access software element 330 so the address specified by network layer 320 is actually the virtual MAC address (e.g., virtual MAC1 address 481 of FIG. 6B). The operations performed by dynamic access software element 330 are transparent to network layer 320, and therefore in effect network layer 320 believes it is addressing the outgoing data packet in a normal fashion.

In this embodiment, network layer 320 utilizes IPX; thus, the address contained in outgoing data packet also includes an IPX address and a socket number. Dynamic access software element 330 classifies the outgoing data packet according to the protocol being used; in this embodiment, the protocol used is IPX and so in this step dynamic access software element 330 indicates the pointers to all of the relevant IPX headers.

In step 710, a class of service snap-in module can be used to prioritize the outgoing data packet according to the class of service specified by the user or network administrator. The outgoing data packet is placed in a queue according to its priority or is sent immediately through the remaining steps of process 700. Various class of service schemes can be implemented in accordance with the present invention.

In step 715, a snap-in module can be used to incorporate protocols being implemented by server computer system 190 (FIG. 2). These protocols include Fast IP (FIP), generic attributes registration protocol (GARP) multicast registration protocol (GMRP), and GARP VLAN registration protocol (GVRP). Various protocols can be implemented in accordance with the present invention.

In step 720, a VLAN tag is inserted into the header of the outgoing data packet. The tag corresponds to the protocol header identified in step 705.

In step 725, the trunk director identifies the load balancing scheme utilized in step 730 (e.g., load balancing scheme 335 of FIG. 4).

In step 730, load balancing scheme 335 utilized by dynamic access software element 330 is executed. The various embodiments of load balancing scheme 335 are described above in conjunction with FIG. 4. Load balancing scheme 335 identifies the NIC to be used to transmit the outgoing data packet. If a NIC is not being used, and the embodiment of load balancing scheme 335 being used does not result in the unused NIC being selected to transmit the outgoing data packet, then a different embodiment is executed until the result identifies the unused NIC as the selected NIC.

In step 735, the fault tolerance module utilized by dynamic access software element 330 is employed. In the present embodiment, the fault tolerance module is a snap-in module and therefore different schemes can be incorporated. The fault tolerance scheme is used to determine whether the NIC selected in step 730 is functioning. The fault tolerance module monitors the NICs and maintains a list of MAC addresses for NICs that are active. The fault tolerance module dynamically adds and removes MAC addresses from the list depending on the status of each NIC. When the selected NIC is found to be disabled (e.g., it is not on the list), a different NIC is substituted from the list. It is appreciated that the fault tolerance module does not have to be in the data stream but can perform its function in the background. The fault tolerance scheme can be utilized without load balancing.

In step 740, the true MAC address corresponding to the NIC selected in steps 730 and 735 (e.g., MAC1 address 471 of FIG. 6B) is inserted into the outgoing data packet in place of the virtual MAC address initially specified by network layer 320.

In step 745, the identifier for the destination VLAN is added to the address of the outgoing data packet per IEEE standard 802.1Q. If only one VLAN is present in the network, then the outgoing data packet passes through this step without modification.

In step 750, the outgoing data packet is forwarded to the selected NIC (see steps 730 and 735), then transmitted out to and over the network.

Figure 8:
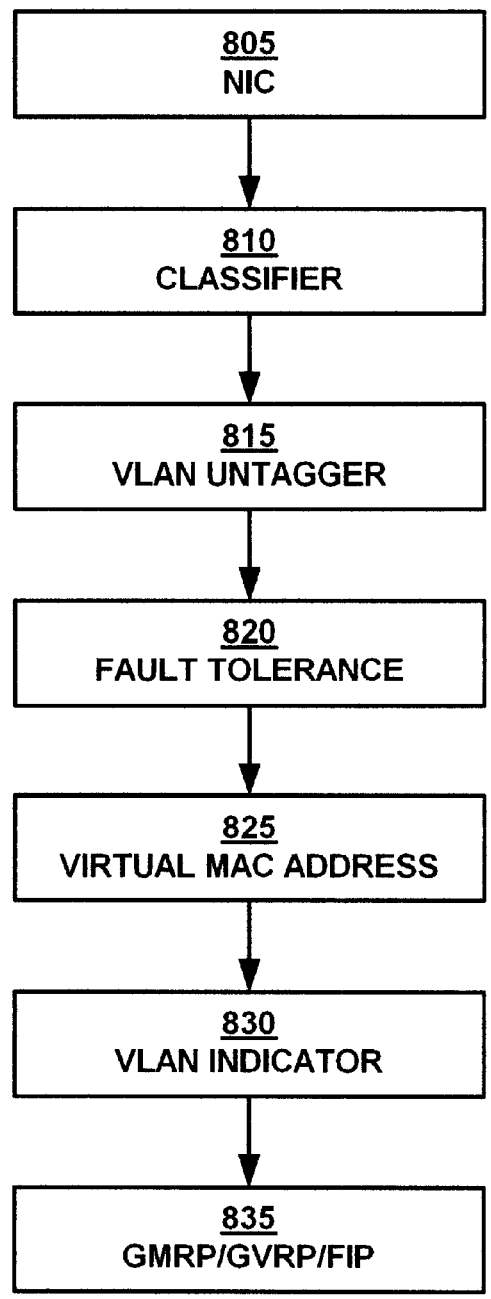
FIG. 8 is a flowchart of one embodiment of the process executed for an incoming data packet in accordance with the present invention.

FIG. 8 is a flowchart of one embodiment of process 800 executed by dynamic access software element 330 for an incoming data packet in accordance with the present invention. Process 800 includes a number of features in addition to load balancing scheme 335 that can be implemented by dynamic access software element 330; however, it is appreciated that in alternate embodiments a subset of these features may be used, and that in other embodiments other features (e.g., snap-ins) not described herein may be implemented.

In step 805, the incoming data packet is received at a NIC. The NIC is bound to dynamic access software element 330 (see FIG. 6B), so the incoming data packet is directly forwarded there.

In accordance with the present invention, if the MAC address in the incoming data packet does not correspond to the MAC address for the NIC at which the incoming data packet is received, a filter in the NIC (e.g., filter 200 of FIG. 3B) is used to mask out a portion or portions of the MAC address in the data packet, thereby causing the NIC to accept the incoming data packet. Additional information is provided in conjunction with the discussion pertaining to FIGS. 3A and 3B.

In step 810, the incoming data packet is classified according to the protocol being used (e.g., IP, IPX, etc.) and the VLAN it came from. In this embodiment, IPX is being used. The VLAN identifier is used to determine to which virtual MAC address the incoming data packet is to proceed. Because only the VLAN identifier is examined, processing of an incoming data packet is minimized.

In step 815, the VLAN identifier is removed from the incoming data packet if a VLAN identifier is present (refer to step 745 of FIG. 7).

In step 820, the fault tolerance module in the present embodiment determines whether the incoming data packet is a "keep-alive" data packet. Data packets are typically sent to determine whether the connection between a client computer system and the server computer system is still active. Also, data packets may also be sent to and from the various NICs as a means for determining whether a NIC is active. These data packets contain no data and hence do not need to continue along the data path to network layer 320 (FIG. 3). Accordingly, the fault tolerance module does not forward keep-alive data packets. Otherwise, the data packet is forwarded through the remaining steps of process 800.

In step 825, the true MAC address (e.g., MAC1 address 471) is replaced with the virtual MAC address (e.g., virtual MAC1 address 481) based on the virtual MAC address selected in step 810. The operations of dynamic access software element 330 are transparent to network layer 320. Network layer 320 is looking for the MAC address it used to address the outgoing data packet (see step 705 of FIG. 7). Thus, dynamic access software element 330 provides the MAC address that network layer 320 is expecting.

In step 830, dynamic access software element 330 determines which protocol to bind the incoming data packet to based on the classification information from step 810.

In step 835, the incoming data packet is examined by the GMRP, GVRP or FIP snap-in modules and treated accordingly if these protocols are being used. The incoming data packet is then forwarded to network layer 320 if appropriate (e.g., GMRP and GVRP data packets are not forwarded).

In summary, in one embodiment the present invention provides a method and system for load balancing and fault tolerance with fail over support for the IPX protocol. The present invention can be used with multiple NICs in a multiple VLAN environment.

With regard to load balancing, the present embodiment of the present invention is designed as a software element that is inserted between the protocol stack (e.g., the network layer) in the server computer system and the NIC drivers. In one embodiment, the present invention is implemented using a dynamic access software element that provides other features and snap-ins. The load balancing scheme is independent of the types of switches, routers, or other hardware used in the computer system network.

The present invention provides a system and method that do not cause data packets to be transmitted or received out of order. In addition, the present invention load balancing scheme does not assign the same NIC to all traffic across a router, balances the load more evenly across all NICs, and does not unnecessarily limit the bandwidth available to a client computer system.

The preferred embodiment of the present invention, high performance load balancing and fault tolerance with fail over support for IPX traffic over multiple NICs, is thus described. While the present invention has been described in particular embodiments, it should be appreciated that the present invention should not be construed as limited by such embodiments, but rather construed according to the following claims.

What is claimed is:

1. In a server computer system adapted to have a plurality of network interface cards (NICs) coupled thereto, a method for selecting a NIC for sending and receiving data packets in an Internet Protocol Exchange (IPX) environment, said method comprising the computer-implemented steps of:
   a) addressing an outgoing data packet using an IPX address and a socket number;
   b) executing a load balancing scheme to specify a first NIC from said plurality of NICs, wherein said load balancing scheme is defined as:

SelectedNIC=(IPXAddress)MOD(NumberNICs);

wherein SelectedNIC is said first NIC, IPXAddress is said IPX address, and NumberNICs is the number of said plurality of NICs;
   c) inserting a media access control (MAC) address in said outgoing data packet, wherein said MAC address represents said first NIC; and
   d) sending said outgoing data packet using said first NIC.

2. The method for selecting a NIC for sending and receiving data packets as recited in claim 1 further comprising the steps of:
   e) verifying functionality of said first NIC using a fault tolerance scheme; and
   f) automatically switching from said first NIC to a second NIC when said fault tolerance scheme indicates said first NIC is not available.

3. The method for selecting a NIC for sending and receiving data packets as recited in claim 2 further comprising the step of:
   using a filter to mask a portion of a MAC address in an incoming data packet such that said MAC address in said incoming data packet is equivalent to a MAC address representing said second NIC.

4. The method for selecting a NIC for sending and receiving data packets as recited in claim 1 wherein said step a) further comprises:
   addressing said outgoing data packet using a virtual MAC address representing said plurality of NICs;
   and wherein said step c) comprises:
      replacing said virtual MAC address with said MAC address of said first NIC.

5. The method for selecting a NIC for sending and receiving data packets as recited in claim 1 wherein said step b) further comprises:
   selecting said load balancing scheme from a plurality of load balancing schemes.

6. The method for selecting a NIC for sending and receiving data packets as recited in claim 5 wherein said step b) further comprises:
   dynamically switching from a first load balancing scheme to a second load balancing scheme when one of said plurality of NICs is not being used.

7. A server-side computer system comprising:
   a bus;
   a processor coupled to said bus; and
   a computer-readable memory unit coupled to said bus;
   said computer system adapted to have a plurality of network interface cards (NICs) coupled thereto;
   said processor for performing a method for selecting a NIC for sending and receiving data packets, said method comprising the steps of:
   a) addressing an outgoing data packet using an Internet Protocol Exchange (IPX) address and a socket number;
   b) executing a load balancing scheme to specify a first NIC from said plurality of NICs, wherein said load balancing scheme is defined as:

SelectedNIC=(IPXAddress)MOD(NumberNICs);

wherein SelectedNIC is said first NIC, IPXAddress is said IPX address, and NumberNICs is the number of said plurality of NICs;
   c) inserting a media access control (MAC) address in said outgoing data packet, wherein said MAC address represents said first NIC; and
   d) sending said outgoing data packet using said first NIC.

8. The computer system of claim 7 wherein said processor performs said method for selecting a NIC for sending and receiving data packets further comprising the steps of:
   e) verifying functionality of said first NIC using a fault tolerance scheme; and
   f) automatically switching from said first NIC to a second NIC when said fault tolerance scheme indicates said first NIC is not available.

9. The computer system of claim 8 wherein said processor performs said method for selecting a NIC for sending and receiving data further comprising the step of:
   using a filter to mask a portion of a MAC address in an incoming data packet such that said MAC address in said incoming data packet is equivalent to a MAC address representing said second NIC.

10. The computer system of claim 7 wherein said processor performs said method for sending and receiving data packets wherein said step a) further comprises:
    addressing said outgoing data packet using a virtual MAC address representing said plurality of NICs;
    and wherein said step c) comprises:
       replacing said virtual MAC address with said MAC address of said first NIC.

11. The computer system of claim 7 wherein said processor performs said method for sending and receiving data packets wherein said step b) further comprises:
    selecting said load balancing scheme from a plurality of load balancing schemes.

12. The computer system of claim 11 wherein said processor performs said method for sending and receiving data packets wherein said step b) further comprises:
    dynamically switching from a first load balancing scheme to a second load balancing scheme when one of said plurality of NICs is not being used.

13. A computer-usable medium having computer readable program code embodied therein for causing a server-side computer system adapted to have a plurality of network interface cards (NICs) coupled thereto to perform the steps of:

a) addressing an outgoing data packet using an Internet Protocol Exchange (IPX) address and a socket number;

b) executing a load balancing scheme to specify a first NIC from said plurality of NICs, wherein said load balancing scheme is defined as:

SelectedNIC=(IPXAddress)MOD(NumberNICs);

wherein SelectedNIC is said first NIC, IPXAddress is said IPX address, and NumberNICs is the number of said plurality of NICs;

c) inserting a media access control (MAC) address in said outgoing data packet, wherein said MAC address represents said first NIC; and d) sending said outgoing data packet using said first NIC.

14. The computer-usable medium of claim 13 wherein said computer-readable program code embodied therein causes a server-side computer system to perform the steps of:

e) verifying functionality of said first NIC using a fault tolerance scheme; and f) automatically switching from said first NIC to a second NIC when said fault tolerance scheme indicates said first NIC is not available.

15. The computer-usable medium of claim 14 wherein said computer-readable program code embodied therein causes a server-side computer system to perform the steps of:

using a filter to mask a portion of a MAC address in an incoming data packet such that said MAC address in said incoming data packet is equivalent to a MAC address representing said second NIC.

16. The computer-usable medium of claim 13 wherein said computer-readable program code embodied therein causes a server-side computer system to perform the steps of:

addressing said outgoing data packet using a virtual MAC address representing said plurality of NICs; and replacing said virtual MAC address with said MAC address of said first NIC.

17. The computer-usable medium of claim 13 wherein said computer-readable program code embodied therein causes a server-side computer system to perform the step of:

selecting said load balancing scheme from a plurality of load balancing schemes.

18. The computer-usable medium of claim 17 wherein said computer-readable program code embodied therein causes a server-side computer system to perform the step of:

dynamically switching from a first load balancing scheme to a second load balancing scheme when one of said plurality of NICs is not being used.

19. In a server computer system adapted to have a plurality of network interface cards (NICs) coupled thereto, a method for selecting a NIC for sending and receiving data packets in an Internet Protocol Exchange (IPX) environment, said method comprising the computer-implemented steps of:

a) addressing an outgoing data packet using an IPX address and a socket number;

b) executing a load balancing scheme to specify a first NIC from said plurality of NICs, wherein said load balancing scheme is defined as:

SelectedNIC=((IPXAddress)XOR(DestIPXSocket-))MOD(NumberNICs);

wherein SelectedNIC is said first NIC, IPXAddress is said IPX address, DestIPXSocket is said socket number for a destination socket, and NumberNICs is the number of said plurality of NICs;

c) inserting a media access control (MAC) address in said outgoing data packet, wherein said MAC address represents said first NIC; and d) sending said outgoing data packet using said first NIC.

20. In a server computer system adapted to have a plurality of network interface cards (NICs) coupled thereto, a method for selecting a NIC for sending and receiving data packets in an Internet Protocol Exchange (IPX) environment, said method comprising the computer-implemented steps of:

a) addressing an outgoing data packet using an IPX address and a socket number;

b) executing a load balancing scheme to specify a first NIC from said plurality of NICs, wherein said load balancing scheme is defined as:

SelectedNIC=((IPXAddress)XOR((SourceIPXSocket)XOR(DestIPXSocket)))MOD(NumberNICs);

wherein SelectedNIC is said first NIC, IPXAddress is said IPX address, SourceIPXSocket is said socket number for a source socket, DestIPXSocket is said socket number for a destination socket, and NumberNICs is the number of said plurality of NICs;

c) inserting a media access control (MAC) address in said outgoing data packet, wherein said MAC address represents said first NIC; and d) sending said outgoing data packet using said first NIC.

21. In a server computer system adapted to have a plurality of network interface cards (NICs) coupled thereto, a method for selecting a NIC for sending and receiving data packets in an Internet Protocol Exchange (IPX) environment, said method comprising the computer-implemented steps of:

a) addressing an outgoing data packet using an IPX address and a socket number;

b) executing a load balancing scheme to specify a first NIC from said plurality of NICs, wherein said load balancing scheme is defined as:

SelectedNIC=((IPXAddress)XOR(SourceIPXSocket-))MOD(NumberNICs);

wherein SelectedNIC is said first NIC, IPXAddress is said IPX address, SourceIPXSocket is said socket number for a destination socket, and NumberNICs is the number of said plurality of NICs;

c) inserting a media access control (MAC) address in said outgoing data packet, wherein said MAC address represents said first NIC; and d) sending said outgoing data packet using said first NIC.

22. A server-side computer system comprising:

a bus;

a processor coupled to said bus; and a computer-readable memory unit coupled to said bus;

said computer system adapted to have a plurality of network interface cards (NICs) coupled thereto;

said processor for performing a method for selecting a NIC for sending and receiving data packets, said method comprising the steps of:

a) addressing an outgoing data packet using an Internet Protocol Exchange (IPX) address and a socket number;

b) executing a load balancing scheme to specify a first NIC from said plurality of NICs, wherein said load balancing scheme is defined as:

SelectedNIC=((IPXAddress)XOR(DestIPXSocket-))MOD(NumberNICs);

wherein SelectedNIC is said first NIC, IPXAddress is said IPX address, DestIPXSocket is said socket number for a destination socket, and NumberNICs is the number of said plurality of NICs;

c) inserting a media access control (MAC) address in said outgoing data packet, wherein said MAC address represents said first NIC; and d) sending said outgoing data packet using said first NIC.

23. A server-side computer system comprising:
a bus;
a processor coupled to said bus; and
a computer-readable memory unit coupled to said bus;
said computer system adapted to have a plurality of network interface cards (NICs) coupled thereto;
said processor for performing a method for selecting a NIC for sending and receiving data packets, said method comprising the steps of:

a) addressing an outgoing data packet using an Internet Protocol Exchange (IPX) address and a socket number;

b) executing a load balancing scheme to specify a first NIC from said plurality of NICs, wherein said load balancing scheme is defined as:

$$SelectedNIC=((IPXAddress)XOR((SourceIPXSocket)XOR(DestIPXSocket)))MOD(NumberNICs);$$

wherein SelectedNIC is said first NIC, IPXAddress is said IPX address, SourceIPXSocket is said socket number for a source socket, DestIPXSocket is said socket number for a destination socket, and NumberNICs is the number of said plurality of NICs;

c) inserting a media access control (MAC) address in said outgoing data packet, wherein said MAC address represents said first NIC; and d) sending said outgoing data packet using said first NIC.

24. A server-side computer system comprising:
a bus;
a processor coupled to said bus; and
a computer-readable memory unit coupled to said bus;
said computer system adapted to have a plurality of network interface cards (NICs) coupled thereto;
said processor for performing a method for selecting a NIC for sending and receiving data packets, said method comprising the steps of:

a) addressing an outgoing data packet using an Internet Protocol Exchange (IPX) address and a socket number;

b) executing a load balancing scheme to specify a first NIC from said plurality of NICs, wherein said load balancing scheme is defined as:

$$SelectedNIC=((IPXAddress)XOR(SourceIPXSocket))MOD(NumberNICs);$$

wherein SelectedNIC is said first NIC, IPXAddress is said IPX address, SourceIPXSocket is said socket number for a destination socket, and NumberNICs is the number of said plurality of NICs;

c) inserting a media access control (MAC) address in said outgoing data packet, wherein said MAC address represents said first NIC; and d) sending said outgoing data packet using said first NIC.

25. A computer-usable medium having computer readable program code embodied therein for causing a server-side computer system adapted to have a plurality of network interface cards (NICs) coupled thereto to perform the steps of:

a) addressing an outgoing data packet using an Internet Protocol Exchange (IPX) address and a socket number;

b) executing a load balancing scheme to specify a first NIC from said plurality of NICs, wherein said load balancing scheme is defined as:

$$SelectedNIC=((IPXAddress)XOR(DestIPXSocket))MOD(NumberNICs);$$

wherein SelectedNIC is said first NIC, IPXAddress is said IPX address, DestIPXSocket is said socket number for a destination socket, and NumberNICs is the number of said plurality of NICs;

c) inserting a media access control (MAC) address in said outgoing data packet, wherein said MAC address represents said first NIC; and d) sending said outgoing data packet using said first NIC.

26. A computer-usable medium having computer readable program code embodied therein for causing a server-side computer system adapted to have a plurality of network interface cards (NICs) coupled thereto to perform the steps of:

a) addressing an outgoing data packet using an Internet Protocol Exchange (IPX) address and a socket number;

b) executing a load balancing scheme to specify a first NIC from said plurality of NICs, wherein said load balancing scheme is defined as:

$$SelectedNIC=((IPXAddress)XOR((SourceIPXSocket)XOR(DestIPXSocket)))MOD(NumberNICs);$$

wherein SelectedNIC is said first NIC, IPXAddress is said IPX address, SourceIPXSocket is said socket number for a source socket, DestIPXSocket is said socket number for a destination socket, and NumberNICs is the number of said plurality of NICs;

c) inserting a media access control (MAC) address in said outgoing data packet, wherein said MAC address represents said first NIC; and d) sending said outgoing data packet using said first NIC.

27. A computer-usable medium having computer readable program code embodied therein for causing a server-side computer system adapted to have a plurality of network interface cards (NICs) coupled thereto to perform the steps of:

a) addressing an outgoing data packet using an Internet Protocol Exchange (IPX) address and a socket number;

b) executing a load balancing scheme to specify a first NIC from said plurality of NICs, wherein said load balancing scheme is defined as $$SelectedNIC=((IPXAddress)XOR(SourceIPXSocket))MOD(NumberNICs);$$

wherein SelectedNIC is said first NIC, IPXAddress is said IPX address, SourceIPXSocket is said socket number for a destination socket, and NumberNICs is the number of said plurality of NICs;

c) inserting a media access control (MAC) address in said outgoing data packet, wherein said MAC address represents said first NIC; and d) sending said outgoing data packet using said first NIC.

* * * * *